United States Patent [19]

Kuzara et al.

[11] 4,003,340
[45] Jan. 18, 1977

[54] STOCK WATERING TROUGH AND STEPPED BASE THEREFOR

[75] Inventors: James H. Kuzara; Norman L. Feck; Vincent P. Johnston, all of Sheridan, Wyo.

[73] Assignee: J-K Mfg. Co., Inc., Sheridan, Wyo.

[22] Filed: Mar. 31, 1975

[21] Appl. No.: 558,971

[52] U.S. Cl. .................................. 119/73; 119/78
[51] Int. Cl.² ........................................ A01K 7/00
[58] Field of Search ................. 119/78, 79, 80, 72, 119/73, 75, 61

[56] References Cited
UNITED STATES PATENTS

| | | | |
|---|---|---|---|
| 3,027,872 | 4/1962 | Nelson | 119/73 X |
| 3,745,977 | 7/1973 | Martin | 119/73 |
| 3,841,268 | 10/1974 | Bunger | 119/73 |

*Primary Examiner*—Hugh R. Chamblee
*Attorney, Agent, or Firm*—Edwin L. Spangler, Jr.

[57] ABSTRACT

This invention relates to a stock watering trough that is kept covered at all times when not in use by a pair of floating lid sections hingedly attached on opposite sides of a transversely-extending support therefor. The lid sections each have a crowned configuration that results in the marginal edges thereof being immersed below the level of the water upon which they float. A thermostatically-controlled immersion heater, float-actuated shut-off valve and overflow drain are all located within a protected area beneath the lids between a pair of oppositely-inclined stops for the latter. These lid sections cooperate with one another and said stop to define shields interposed between the aforementioned working parts and the drinking animals. The exposed surfaces of the trough including the lids are formed from a smooth, easily-cleaned light-colored plastic material laminated to a dark-colored backing impregnated with a heat-reflective substance, preferably ablated mica. The trough has upwardly and inwardly sloping outer wall surfaces that include integrally-formed triangular webs projecting outwardly therefrom that cooperate to prevent the animals from stepping over the rim into the reservoir while, at the same time, allowing them to drink easily therefrom with their front feet resting comfortably upon a concrete base surrounding same. The concrete base comprises a poured slab having a step formed therein spaced from the edge of the trough a distance such that an animal standing beyond same cannot back up to the trough close enough to foul it.

7 Claims, 6 Drawing Figures

U.S. Patent  Jan. 18, 1977  4,003,340
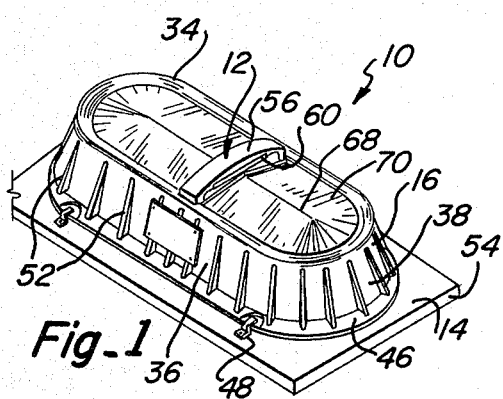
Fig_1
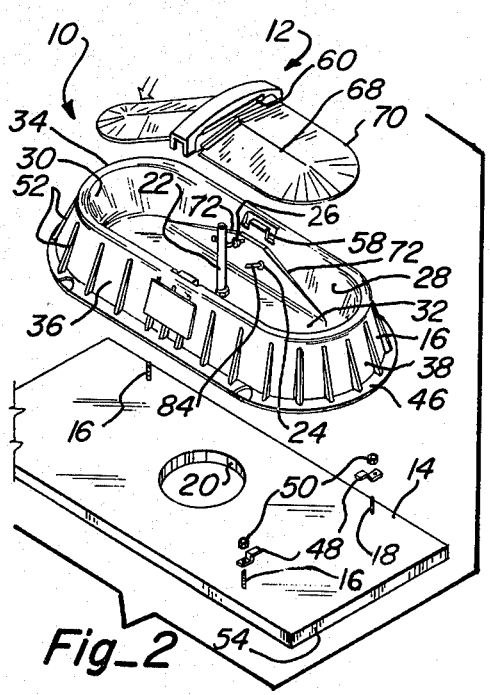
Fig_2
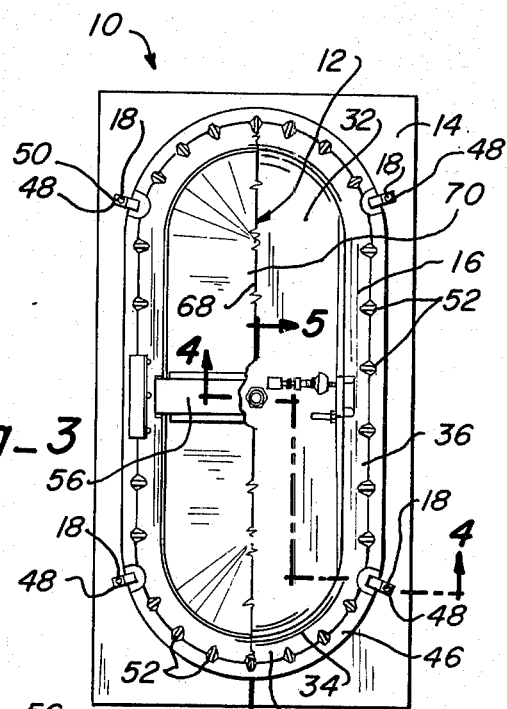
Fig_3
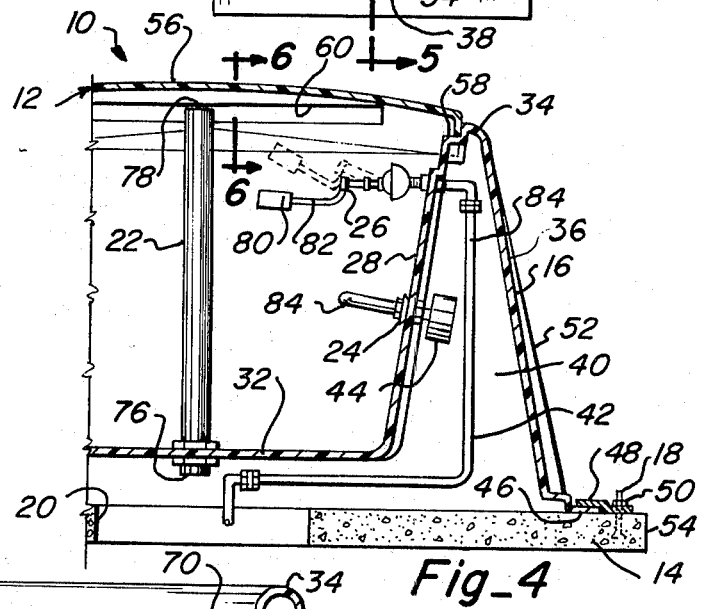
Fig_4
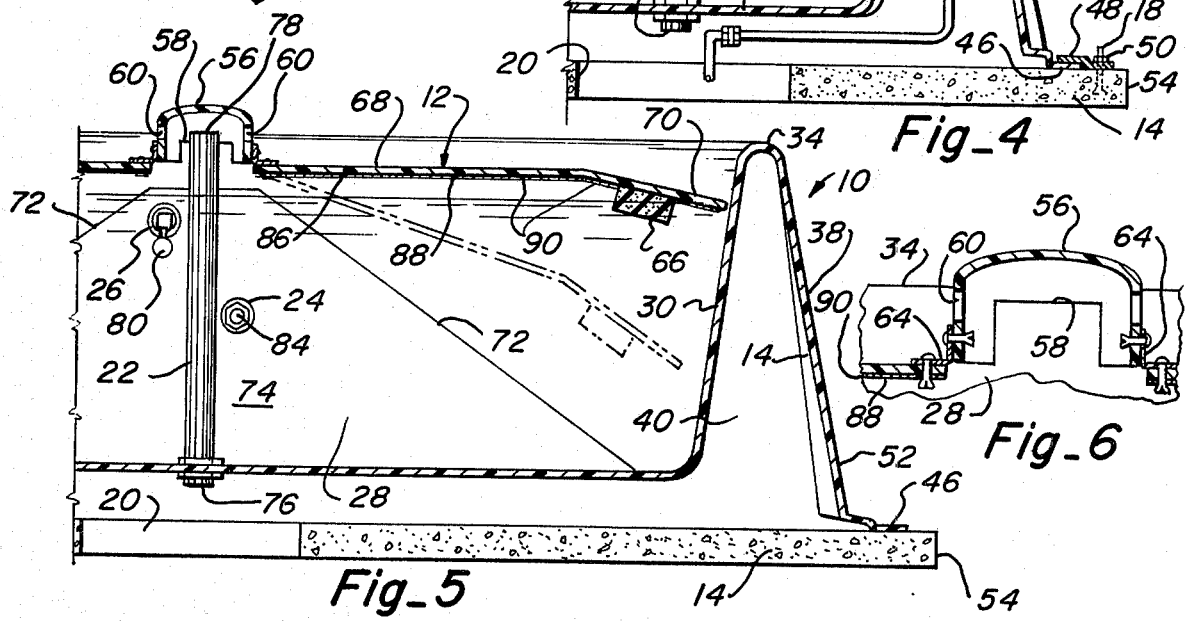
Fig_5  Fig_6

STOCK WATERING TROUGH AND STEPPED BASE THEREFOR

Stock watering troughs of many different sizes, shapes and designs have been in use and will continue to be used wherever cattle are raised. Dairy cattle and the like housed in barns present entirely different problems from range cattle whose needs in the way of food and water must, of necessity, be taken care of independent of human assistance.

Range cattle, left to their own devices, will quickly foul their own drinking water unless measures are taken to prevent their doing so. It is not uncommon for them to stand in their drinking water trough with the result that they not only introduce foreign material therein from their feet but may, at the same time, dump it over or damage same to the point where it won't function properly.

Completely apart from the damage the cattle themselves can do to a poorly designed trough, there are a number of other shortcomings of the prior art units which have nothing to do with the improper use thereof by the animals, but rather, the failure of the designer to accommodate their needs. Among such deficiencies are such things as the protection of the water from contaminants introduced from other sources than the cattle themselves such as the wind, birds, etc. Keeping the water at a uniform temperature both winter and summer of around 55° F. is most desirable for the reason that investigators have discovered that water at this temperature aids the digestive processes resulting in optimum utilization of the feed eaten. While heating the water in stock tanks and troughs to keep it from freezing in an old and well-known expedient, designing a tank with good thermal efficiency is not.

Other problems are those of the failure to provide adequate footing for the cattle while they drink because, without same, the water slopped over onto the ground creates a mudhole in which they stand and dig a trench in time. Such trenches must be filled in periodically otherwise the cattle, especially the calves, cannot reach the trough to drink therefrom.

It has been found in accordance with the teachings of the instant invention that these and other shortcomings of the prior art stock watering tanks can, in large measure, be overcome by the novel, yet unexpected, expedient of forming a trough with a shape and mounting same upon a base that precludes any use thereof in a manner to foul same. Fouling from other sources than the cattle themselves is prevented by keeping the trough constantly covered except when in use. By crowning the lids and floating them upon the surface of the water, it becomes possible to maintain the marginal edges thereof slightly immersed even when not depressed thus enabling the animal to drink from the trough even without actuating the lid. The centrally-hinged lids cooperate with an inclined limit stop within the reservoir to interpose shields between the drinking animals and all vital parts. Improved wall construction coupled with covering the reservoir contribute to an overall cost saving to maintain the water at a given temperature during cold weather of as much as 50% over comparable prior art heated units.

It is, therefore, the principle object of the present invention to provide a novel and improved stock watering trough and base therefor.

A second objective of the invention is to provide a unit of the type described which is so shaped and mounted that the animals are prevented from fouling same.

Another object of the within described invention is the provision of a watering trough wherein all of the operating parts are housed within a protected area underneath and behind the hinged lid sections.

Still another objective of the invention herein disclosed and claimed is the provision of a watering station for range animals and the like that includes a stepped foundation which prevents their backing up close enough to the trough resting thereon to foul same while, at the same time, providing firm footing while they drink.

An additional object is to provide an insulated stock watering trough that includes thermostatically-controlled immersion heater automatically operative to maintain the water temperature at about 55° F. during cold weather at a cost of about half that required to maintain the same temperature in comparable electrically-heated prior art units.

Further objects are to provide a stock watering trough that is simple, rugged, simple to clean and flush, reliable, efficient, easy to install, relatively inexpensive and decorative in appearance.

Other objects will be in part apparent and in part pointed out specifically hereinafter in connection with the description of the drawings that follows, and in which:

FIG. 1 is a perspective view looking down upon the watering trough from a point above and to one side thereof;

FIG. 2 is an exploded perspective view from the same vantage point as FIG. 1 and to the same scale;

FIG. 3 is a top plan view of the trough to a slightly larger scale than FIGS. 1 and 2 and with the lid broken away to reveal the interior construction;

FIG. 4 is a fragmentary section to an enlarged scale taken along line 4—4 of FIG. 3;

FIG. 5 is a fragmentary section to the same scale as FIG. 4 taken along line 5—5 of FIG. 3; and, FIG. 6 is a further enlarged fragmentary detail taken along line 6—6 of FIG. 4.

Referring next to the drawings for a detailed description of the present invention and, initially, to FIGS. 1, 2 and 3 for this purpose, reference numeral 10 has been selected to broadly designate the watering trough in its entirety, numeral 12 to similarly designate the lid subassembly, and numeral 14 the poured concrete slab that defines the base atop which the storage reservoir 16 rests and to which it is fastened by cast-in-place studs 18. Centrally-located within the base 14 is an opening 20 through which the reservoir drain 22 empties. Ordinarily, a pipe of some type (not shown) buried in the ground in upstanding position beneath opening 20 will be used to carry off the water into some sort of subterranean gravel-filled pit so that the area surrounding the base will not become a mud-filled quagmire. Once the reservoir is attached in place atop the previously prepared base and the various plumbing and heating connections have been made, the lid subassembly 12 merely snaps in place atop the reservoir in a manner to be described in more detail presently. Contained inside the reservoir 16 in addition to drain 22 are the immersible heater 24 and water inlet valve 26.

The reservoir is shaped to produce a generally oval-shaped configuration having downwardly and inwardly sloping interior side and end walls, 28 and 30, respectively, that cooperate with a bottom wall 32 to define an open-topped liquid-tight chamber. A curved rim 34 borders this chamber along the top edge thereof and connects it to downwardly and outwardly sloping exterior side walls 36 and exterior end walls 38 so as to leave a void 40 (FIGS. 4 and 5) therebetween in which the plumbing 42 and wiring 44 are housed. A marginal flange 46 encircles the reservoir and is essentially planar so as to lie flat atop the base 14. Hold-down clamps 48 secured by nuts 50 on the studs 18 engage this flange and hold the reservoir in place as shown most clearly in FIG. 5. Upstanding integrally-formed generally triangular webs 52 are spaced around the exterior walls of the reservoir and they cooperate with the sloped condition of these walls to hold the feet of the animal far enough out on the base so that it becomes very difficult for it to step into the reservoir while, at the same time, providing ready access to the water therein for drinking purposes.

The top surface of the base 14 is raised above ground level several inches to produce a step 54. The height of this step, while only a few inches, and its location spaced outwardly beyond the flange 46 bordering the bottom of the reservoir, is such that it effectively prevents an animal backed up thereagainst from fouling the water. A cow seems to be incapable of, or at least reluctant to, step up onto the base over step 54 with its back feet. In this way a serious fouling problem present in the prior art stock watering systems is effectively taken care of by the stepped base, the step in which is located well outwardly of the lowermost margins of the reservoir. The cattle exhibit no reluctance to step up onto this step with their front feet and, when they have done so, their heads are located at a proper height for drinking purposes. Furthermore, with their feet thus supported upon the concrete slab, they cannot dig a trench around the waterer as often occurs with the prior art watering troughs.

Next, with reference to FIGS. 4, 5 and 6 of the drawings, the details of the lid subassembly 12 will be set forth. A generally channel-shaped support member 56 extends transversely across the top of the reservoir 16 midway between the ends thereof. The ends of this element are detachably received within inverted generally U-shaped grooves 58 formed in opposed relation in the opposite interior side walls 28, the latter having been revealed most clearly in FIGS. 2 and 6. Longitudinally-extending slots 60 in the sides of this support member ventilate the air space beneath the lid subassembly and above the water in the reservoir.

The lid itself 62 comprises a pair of identically-shaped sections hingedly attached to the sides of the support member with a pair of foldable plastic strap hinges 64. These lid sections each carry floats 66 on the underside thereof which normally buoy them up onto the surface of the water as shown most clearly in FIG. 5. Polyurethane blocks have proven quite satisfactory for this purpose although cork and other well-known materials having a density less than that of water could also be used. As soon as the animal presses against the lid section with his nose, the pressure thus applied is adequate to submerge the lid and overcome the buoyant action of the float, whereupon, it tilts down into the broken line position of FIG. 5. While the ends of the lid sections fit rather snugly against the interior end walls 30 of the reservoir as shown in FIG. 5, a small gap is left between the side margins of the lid sections and the adjacent side walls 28 of the reservoir to accommodate the slope in the latter.

In the particular form shown, the lid sections are crowned in the center as indicated by ridge 68 so that the marginal edges 70 lie considerably below the latter. The weight of these lid sections and the buoyant effect of floats 66 is preferably selected such that these marginal edges 70 are slightly submerged as indicated in FIG. 5. Cattle such when they drink as opposed to the tongue lapping action of many other animals and, for this reason, they can drink rather effectively from the instant watering trough by sucking up the water on top of the lid margins without ever depressing the latter.

Inclined stop-forming ledges 72 are formed integral with the interior side walls 28 of the reservoir in position to impinge against the underside of each lid section and prevent its being depressed beyond the point where it could be jammed against the bottom and broken or otherwise damaged. With the lid sections resting against these inclined stops 72, they form barriers effective to prevent the animals from reaching the plumbing and electrical components, the exposed portions of which are all housed within the protected area 74 (FIG. 5) thus formed between the depressed lid sections.

In FIG. 4 it will be seen that the drain is a conventional overflow pipe mounted in upstanding position within centrally-located drain opening 76 that registers with the considerably larger opening 20 in the base. The inlet 78 into the drainpipe terminates inside overhead support member 56 well above the water level maintained in the reservoir by float-acutated water inlet valve 26 as shown. The latter valve has a float 80 on the end of actuating arm 82 that normally occupies the broken line position of FIG. 4 signifying that the reservoir is full and that the water inlet line 84 is shut off. When, of course, the water level drops to the point where float 80 can reach the full line position of FIG. 4, valve 26 will reopen and admit more water. Here again, the exposed parts of valve 26 are housed within the protected area 74 behind the hinged lid sections when in depressed position.

Heater 24 is of the conventional electrically-powdered type having a submersible heating element 84 projecting out into the reservoir beneath the level of the water maintained therein. The heater is thermostatically-controlled to automatically maintain a water temperature during cold weather of 55° F. ± 5°. Its significance insofar as the present invention is concerned lies in the fact that it, together with the drain and valve 26 all lie within the protected area 74 shielded by the lid sections.

Finally, with brief reference to FIG. 7, it will be seen that the entire reservoir and lid subassembly are preferably fabricated with a laminated wall having a smooth outer layer 86 to the back of which is bonded a rough layer 88 impregnated with flakes of ablated mica 90 that forms a heat reflective barrier. The smooth exterior surface is easy to clean and algae will not adhere thereto. It is also preferably of a light color so as to reflect heat during warm weather so as to keep the water in the reservoir as near 55° F. as possible. The inner layer 88, on the other hand, is rough surfaced and dark colored to absorb heat and keep the water in the reservoir warm. The reflective capacity of the ablated mica chips and flakes 90 coupled with the roughened dark-colored surface of the inner layer are so effective to retain heat that tests show well in excess of a 50% saving in power cost over a comparable prior art unit similarly heated.

What is claimed is:

1. A stock watering trough comprising: upstanding side and end walls cooperating with one another and with a bottom wall to define an open-topped reservoir; lid-supporting means bridging the side walls intermediate the end walls; means for filling and for draining said reservoir located therein beneath the lid-supporting means; lid-forming means hingedly attached to said lid-supporting means for tiltable movement between a closed horizontally-disposed position covering the open top of said reservoir and an open position depressed down into the latter, said lid-forming means in open position cooperating with said side and bottom walls to define a barrier effective to deny a drinking animal access to said means for filling and draining said reservoir; and, submersible float means fastened to the underside of said lid-forming means effective to normally maintain the latter in closed position when said reservoir is full.

2. The stock watering trough as set forth in claim 1 in which: the side and end walls include exterior and interior surfaces of which said exterior surfaces slope upwardly and inwardly.

3. The stock watering trough as set forth in claim 1 in which: the walls of the reservoir and the lid-forming means are impregnated with a heat-reflective material.

4. The stock watering trough as set forth in claim 1 in which: the lid-forming means comprises a pair of indenpendently hinged sections attached to opposite sides of the lid-supporting means, each of said lid sections being shaped so as to slope downwardly and outwardly toward the unhinged marginal edges thereof; and, in which the float means cooperates with said lid sections in the closed position of the latter to leave said marginal edges thereof submerged.

5. The stock watering trough as set forth in claim 1 in which: stop-forming means project inwardly from the side walls of the reservoir in position to engage and support the lid-forming means in open position.

6. The stock watering trough as set forth in claim 3 in which: the heat-reflective material is ablated mica.

7. The stock watering trough as set forth in claim 5 in which: the stop-forming means comprises an inclined ledge.

* * * * *